United States Patent

Levy

[15] 3,637,526

[45] Jan. 25, 1972

[54] PREPARATION OF OXIDATION CATALYST

[72] Inventor: Leon B. Levy, Corpus Christi, Tex.
[73] Assignee: Celanese Corporation, New York, N.Y.
[22] Filed: Apr. 2, 1970
[21] Appl. No.: 25,305

[52] U.S. Cl. .......................252/439, 260/533 N, 260/604 R
[51] Int. Cl. ..............................................B01j 11/74
[58] Field of Search.......................260/533 N, 604 R, 530 N; 252/439

[56] References Cited

UNITED STATES PATENTS 2,754,325  7/1956  Smith..................................252/439 X Primary Examiner—Patrick P. Garvin
Attorney—Thomas J. Morgan, Marvin Turken and Kenneth A. Genoni

[57] ABSTRACT

Disclosed herein is a process for preparing an oxidation catalyst containing molybdenum, tungsten, tellurium, and oxygen, which catalyst has particular utility for the oxidation of propylene to acrolein. A preferred embodiment comprises forming an aqueous solution of ammonium paratungstate and ammonium molybdate, evaporating the liquid from the solution, pulverizing the solid, and then calcining at a temperature of about 400° C. The calcinate is then mixed with tellurium dioxide and the admixture is calcined. This procedure gives longer catalyst life for the oxidation of propylene to acrolein.

10 Claims, No Drawings

PREPARATION OF OXIDATION CATALYST

Copending application Ser. No. 795,028, filed Jan. 29, 1969 and incorporated herein by reference, discloses and claims a process for oxidizing an ethylenically unsaturated hydrocarbon, e.g., propylene, to the corresponding aldehyde, e.g., acrolein, or acid, e.g., acrylic, using a catalyst of the empirical formula: $Mo_x W_y Te_z O_n$ wherein $x$, $y$, $z$, and $n$ are numbers such that the atomic ratio of Mo:W:Te:O is 100:50–250:0.3–3.5:400–1,100. In the copending case, the catalyst is prepared by calcining a solid obtained by combining (a) a molybdic acid or ammonium salt thereof, (b) a tungstic acid or ammonium salt thereof and (c) an inorganic tellurium compound.

The process disclosed herein is particularly useful for preparing catalysts defined by the above empirical formula. However, the invention can be used to prepare catalysts containing the same, or even additional, elements having proportions different from those stated above. In fact, if the catalyst is to be used for a purpose other than propylene oxidation, it may be desirable to vary the proportions.

SUMMARY OF THE INVENTION

It has now been discovered that catalyst life can be increased by using two calcining steps. The mixture of the molybdic acid or salt and the tungstic acid or salt is calcined. The tellurium compound is added to the calcinate and the resulting admixture is calcined.

It has also been discovered that the activity and aldehyde and acid selectivities can be increased by utilizing very finely divided particles of the tellurium compound.

DETAILED DESCRIPTION

The improved catalyst is prepared by admixing molybdic acid or the ammonium salt thereof, with tungstic acid or the ammonium salt thereof, calcining the admixture at a temperature of from 250° to 550° C., preferably from 300° to 500° C., for from about 4 to 30 hours, preferably from 6 to 20 hours; admixing an inorganic tellurium compound with the calcinate, and calcining the admixture at a temperature of from 250° to 550° C., preferably from 300° to 500° C., for from 4 to 30 hours, preferably from 6 to 20 hours. The second calcinate can then be used in any desired form such as pellets or granules.

The admixing of the molybdic acid or ammonium salt thereof with the tungstic acid or ammonium salt thereof is best effected by combining an aqueous solution of the first ingredient with an aqueous solution of the second ingredient. One can also use a minor amount of water as a dispersant, but this is not as effective as forming an aqueous solution. Tests using a minor amount of water as a dispersant, but not enough to dissolve the compounds, indicated the aldehyde and acid selectivities were still high, but catalyst activity was lower than observed in those cases where a solution was formed. It is not presently known whether or not dry mixing of the ingredients is effective. It is believed that other solvents or dispersing agents can be employed. Thus, tetrahydrofuran or dioxane should have the necessary solvating properties. The particle size of the molybdenum and tungsten compounds is not critical, especially if they are dissolved. If they are merely dispersed, not dissolved, it is desirable to use particles that screen through from 75 to 300 mesh, U.S., preferably from 150–250 mesh, U.S. A less expensive alternative method exists for forming the catalyst solution. The oxides of molybdenum and tungsten can be dissolved in aqueous ammonia, thereby forming the ammonium compounds and effecting mixing.

After admixing, the liquid solvent or dispersant should be removed in any suitable manner such as by spray drying or evaporation. Prior to the first calcination, the dry solids, if in the form of agglomerates, should be pulverized to ensure even heating of the particles. In general it is desireable to calcinate particles that screen through about 60 to 300 mesh, U.S.

The salts that can be used include ammonium paramolybdate, ammonium paratungstate, and ammonium metatungstate. Ammonium paratungstate is preferred over ammonium metatungstate because longer catalyst life has been observed using the former. In addition, orthotungstic acid and metatungstic acid can be used.

After the first calcination, the calcinate is mixed with an inorganic tellurium compound such as ammonium tellurate, tellurium dioxide or telluric acid. Tellurium dioxide is preferred. The ingredients can be dry mixed but preferably a liquid dispersant is employed. Water is suitable and it is believed that any inert liquid can be employed.

The inorganic tellurium compound admixed with the calcinate should be finely divided. The particles can be screened through 60 mesh, U.S.; it has been discovered, however, that increased catalyst activity and increased aldehyde and acid selectivities will be obtained if the tellurium particles used are sufficiently small to pass through a 200 mesh, U.S., screen. Screening to obtain still smaller particles is not detrimental but is not particularly advantageous.

After the second calcination, the catalyst may be granulated or pelleted. Alternatively, the mixture of the first calcinate and the tellurium compound can be pelleted prior to the second calcination.

The catalyst prepared as described herein can be used for the oxidation of propylene to acrolein and acrylic acid as described in copending application Ser. No. 795,028. The catalyst having the same or different proportions of elements may also be useful for other oxidation reactions.

EXAMPLE I

This example is included to show typical results that can be obtained using a single calcination.

A solution of 191.4 grams of ammonium metatungstate in 300 cubic centimeters of water was combined with a solution of 120 grams of ammonium molybdate in 225 cubic centimeters of water at 50° C. To the combined solution was added a solution of 1.29 grams of tellurium dioxide in 600 cubic centimeters of hydrochloric acid. The solution was evaporated dry and the solid was calcined at 400° C. for 16 hours and screened through 20 and 30 mesh, U.S.

The catalyst, 5 cubic centimeters, was charged to a fixed bed tubular reactor and the following materials were fed to the reaction at the rates shown:

| | |
|---|---|
| Propylene | 13.4 milliliters per minute |
| Air | 202 milliliters per minute |
| Water vapor | 122 milliliters per minute |

A reaction temperature of 450° C. was maintained for 113 hours and was then raised to 472° C. in an attempt to increase activity. The pressure was one atmosphere. The results are shown in the following table.

TABLE I m W—Mo—Te O Catalyst Life Studies (450° C., 0.9-second contact time[1])

| Catalyst age hours | 5 | 34 | 113 | 130[2] |
|---|---|---|---|---|
| Propylene conversion, % | 93 | 84 | 59 | 69 |
| Acrolein yield, % | 64 | 62 | 45 | 45 |
| Acrylic acid yield, % | 12 | 9 | 4 | 7 |

[1] Contact time = $\dfrac{\text{Catalyst volume, ml.}}{\text{Total feed flowrate, ml. per sec.}}$

[2] 472° C.

EXAMPLE II

A catalyst having the empirical formula of $W_{100}Mo_{100}Te_{1.2}O_n$ was prepared by combining a solution of 61.2 grams ammonium paratungstate in 2 liters of water at 70° C. with a solution of 40.0 grams of ammonium molybdate in 75 cubic centimeters of water at about 50° C., evaporating the solution, pulverizing the resulting solid, and calcining the solid at 400° C. for 16 hours. The calcinate was blended with 0.43 grams of tellurium dioxide using a Waring Blender and 100 cubic centimeters of water as a dispersing medium. The slurry was evaporated dry, calcined at 400° C. for 16 hours, and the solid was screened to −20+30 mesh, U.S.

The catalyst, 5 cubic centimeters, was charged to a fixed bed tubular reactor and the following materials were fed at the rates shown:

| Propylene | 13.3 milliliters per minute |
|---|---|
| Air | 202 milliliters per minute |
| Water vapor | 122 milliliters per minute |

As can be seen from the contact time values in the following table, the initial feed rate was cut in about half at 5 and 25 hours but was returned to the original at 32 hours. The results are summarized in the following table:

TABLE II

| Catalyst age, hr. | 0 | 5 | 25 | 32 | 118 |
|---|---|---|---|---|---|
| Temperature ° C. | 400 | 400 | 424 | 420 | 420 |
| Contact time NT, Pres. | 1.8 | 0.96 | 0.95 | 1.8 | 1.8 |
| Conversion, % | 93 | 67 | 69 | 83 | 81 |
| Acrolein yield, % | 75 | 61 | 62 | 71 | 66 |
| Acrylic acid yield, % | 10 | 2 | 3 | 6 | 8 |

These data when compared with table I indicate that the use of two calcinations increases catalyst life. The data at 32 and 118 hours is particularly interesting. For a period of 86 hours, the activity of the catalyst remained substantially constant.

EXAMPLE III

Another batch of catalyst was prepared as described in example II. The catalyst, 10 cubic centimeters, was charged to a fixed bed tubular reactor and a feed of the following composition was fed at a rate of 300 milliliters per minute. The NTP contact time was 2 seconds and the pressure was one atmosphere.

| Propylene | 6% |
|---|---|
| Oxygen | 12.6% |
| Nitrogen | 48% |
| Water | 33.4% |

The results are shown in the following table.

TABLE III

| Catalyst Age hrs. | 4 | 127 | 294 | 493 | 603 | 862 |
|---|---|---|---|---|---|---|
| Temperature, ° C. | 400 | 400 | 443 |  | 443 | 443 |
| Conversion, % | 95 | 79 | 73 | 83 | 73 | 66 |
| Acrolein yield, % | 64 | 64 | 61 | 61 | 59 | 50 |
| Acrylic acid yield, % | 13 | 6 | 3 | 9 | 6 | 4 |

These data, compared to the data in table I, also show the superiority of two calcinations with regard to increasing catalyst life.

EXAMPLE IV

This example demonstrates the desirability of using tellurium dioxide particles screened through 200 mesh, U.S. catalyst B was prepared as described in example II. Catalyst A was prepared in the same manner with the exception that the tellurium dioxide particles were screened to 200 mesh, U.S. The unscreened particles used in the preparation of catalyst B contained 77 percent solids having a particle size greater than 200 mesh, U.S.

Each catalyst, 5 cubic centimeters, was charged to separate fixed bed tubular reactors and to each reactor a feed of the following composition was fed at about 167 milliliters per minute.

| Propylene | 5.86% |
|---|---|
| Oxygen | 13.2% |
| Nitrogen | 49.7% |
| Water | 31.24% |

An NTP contact time of 1.8 seconds and a pressure of 1 atmosphere were maintained. The data in the following table show the superiority of catalyst A.

TABLE IV

| Catalyst | A | B |
|---|---|---|
| Temperature, ° C. | 374 | 400 |
| Contact time, sec. (NTP) | 1.8 | 1.8 |
| Propylene conversion, % | 99 | 87 |
| Acrolein selectivity, % | 62 | 23 |
| Acrylic acid selectivity, % | 18 | 11 |

It is significant that catalyst A gave better results even though a lower temperature was employed. The ability to use a lower operating temperature permits one to obtain longer catalyst life.

EXAMPLE V

A catalyst was prepared as in example II except that the aqueous solution of ammonium paratungstate and ammonium molybdate was spray dried and the tellurium dioxide particles were screened through 200 mesh, U.S.

The catalyst, 5 cubic centimeters, was charged to a fixed bed tubular reactor and a feed of the following composition was fed at 176 milliliters per minute.

| Propylene | 5.97% |
|---|---|
| Oxygen | 12.68% |
| Nitrogen | 47.76% |
| Water | 33.59% |

An NTP contact time of 1.7 and a pressure of 1 atmosphere were maintained. The results are shown in the following table.

TABLE V

| Catalyst age, hr. | 39 | 150 | 323 |
|---|---|---|---|
| Temperature, ° C. | 374 | 374 | 374 |
| Conversion, % | 95 | 94 | 94 |
| Acrolein yield, % | 62 | 60 | 62 |
| Acrylic acid yield, % | 14 | 14 | 15 |

What is claimed is:

1. A process for the production of a catalyst composition containing molybdenum, tungsten, tellurium and oxygen which process comprises:
   admixing molybdic acid or the ammonium salt thereof with tungstic acid or the ammonium salt thereof in the presence of a suitable liquid in an amount ranging from an amount sufficient to act as a dispersant to amounts sufficient to dissolve the materials;
   removing the liquid to obtain dry solids;
   calcining said solids at a temperature of from 250° to 550° C. for from about 4 to 30 hours;
   admixing an inorganic tellurium compound selected from the group consisting of telluric acid, ammonium tellurate and tellurium dioxide with the calcinate; and calcining the admixture at a temperature of from 250° to 550° C. for from about 4 to 30 hours.

2. A process according to claim 1 wherein said liquid is water in an amount sufficient to dissolve the molybdenum and tungsten compounds.

3. A process according to claim 1 wherein said tellurium compound is tellurium dioxide.

4. A process according to claim 1 wherein the particles of said tellurium compound are sufficiently small to pass through a 200 mesh, U.S., screen.

5. A process according to claim 1 wherein ammonium molybdate and ammonium paratungstate are employed.

6. A process for preparing a catalyst having the following empirical formula:

$$Mo_xW_yTe_zO_n$$

wherein $x$, $y$, $z$ and $n$ are numbers such that the atomic ratio of Mo: Te: O is 100:50–250:0.3–3.5:400–1,100; which process comprises:

combining an aqueous solution of molybdic acid or the ammonium salt thereof with an aqueous solution of tungstic acid or the ammonium salt thereof;

removing water from the solution;

pulverizing the solids to obtain particles that screen through 60 to 300 mesh, U.S.;

calcining the pulverized solids at a temperature of from 250° to 550° C. for from 4 to 30 hours;

admixing particles sufficiently small to screen through 60 to 400 mesh, U.S., of an inorganic tellurium compound selected from the group consisting of telluric acid, ammonium tellurate and tellurium dioxide with the calcinate;

calcining the admixture at a temperature of from 250° to 550° C. for from 4 to 30 hours.

7. A process according to claim 6 wherein said inorganic tellurium compound is in the form of particles sufficiently small to pass through a 200 mesh, U.S. screen.

8. A process for preparing a catalyst having the following empirical formula:

$$Mo_xW_yTe_zO_n$$

wherein $x$, $y$, $z$ and $n$ are numbers such that the atomic ratio of Mo:W:Te:O is 100:50–250:0.3–3.5:400–1,100; which process comprises:

blending an ammonium molybdate with an ammonium tungstate in an aqueous solution;

evaporating the solution dry;

calcining the resulting particles that screen to 60 to 300 mesh, U.S., at temperatures of from 300° to 500° C. for from 6 to 20 hours admixing particles of tellurium dioxide with the resulting calcinate; and calcining the solids at a temperature of from 300° to 500° C. for from 6 to 20 hours.

9. A process according to claim 8 wherein said tellurium dioxide is in the form of particles sufficiently small to pass through a 200 mesh, U.S., screen.

10. A process according to claim 8 wherein said ammonium tungstate is ammonium paratungstate.

* * * * *